United States Patent [19]

Harber

[11] Patent Number: 4,725,458

[45] Date of Patent: Feb. 16, 1988

[54] URETHANE MODIFIED NYLON MAGNET WIRE ENAMEL

[75] Inventor: Joseph J. Harber, Fort Wayne, Ind.

[73] Assignee: Essex Group, Inc., Fort Wayne, Ind.

[21] Appl. No.: 945,160

[22] Filed: Dec. 22, 1986

[51] Int. Cl.$^4$ .............................................. B05D 3/02
[52] U.S. Cl. ................................. 427/388.1; 427/120; 428/379; 428/383; 525/420; 525/424; 525/425
[58] Field of Search ..................... 525/420, 424, 425; 428/379, 383; 427/388.1, 120

[56] References Cited

U.S. PATENT DOCUMENTS

| | | | |
|---|---|---|---|
| 4,031,287 | 6/1977 | Suzuki et al. | 427/388.1 |
| 4,448,936 | 5/1984 | Wang et al. | 525/429 |
| 4,550,055 | 10/1985 | Lavallee | 428/379 |
| 4,551,398 | 11/1985 | Lavallee | 428/353 |
| 4,568,607 | 2/1986 | Lavallee | 428/379 |
| 4,588,784 | 5/1986 | Lavallee | 428/379 |
| 4,631,201 | 9/1986 | Lavallee | 427/120 |

Primary Examiner—Thurman K. Page
Assistant Examiner—L. R. Horne
Attorney, Agent, or Firm—Alan C. Cohen

[57] ABSTRACT

Disclosed is a magnet wire composition comprising the reaction product of a polyamide resin, a titanate catalyst, and a solvolytic agent admixed with a blocked polyisocyanate and hydroxylated polyester. Also disclosed is a method of applying such a magnet wire enamel to a magnet wire substrate and additionally disclosed is a method for making such magnet wire enamel.

7 Claims, No Drawings

URETHANE MODIFIED NYLON MAGNET WIRE ENAMEL

CROSS REFERENCE TO RELATED APPLICATIONS

This application relates to commonly assigned, U.S. patent application Ser. No. 945,159 now U.S. Pat. No. 4,716,190, for A METHOD FOR EQUILIBRATING POLYAMIDE MAGNET WIRE COATINGS AND ENAMEL COMPOSITIONS by F. A. Lavallee filed on even date herewith.

TECHNICAL FIELD

The technical field of art to which this invention pertains is polyamide coating compositions and particularly nylon coating compositions on insulated magnet wire substrates.

BACKGROUND ART

Magnet wire enamels constitute unique insulating materials. These enamels are applied to wire substrates as an uncured resin layer which is then cured by exposing it to elevated temperatures. These insulating layers have typical thicknesses ranging in tenths of a mil and the entire insulating layer may comprise a plurality of individually applied and cured layers of the same or different resins. These insulating layers must possess certain qualities such as high dielectric strength, excellent flexibility, thermal stability and must be capable of uniform application to the wire substrate.

In the past, enamels have been prepared from polyamide resin materials or modified polyamide resins, however, many of these enamels had to be prepared as low solids materials to maintain the desired viscosity which would allow easy and uniform application to the wire. Since presently it is desirable to increase the solids content of these enamels, thereby lowering the amount of solvents used and thereby the cost of the enamel, such polyamide resins have been equilibrated in a reaction between the polyamide and a monoethanolamine as shown in reaction 1:

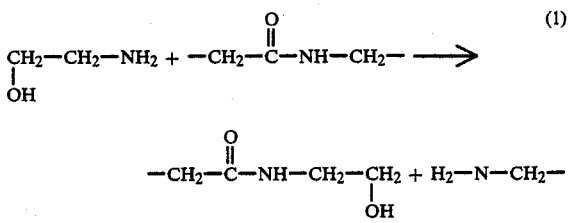
(1)

This reaction requires that an excess of monoethanolamine be present during the reaction. The excess must be neutralized prior to the coating being applied to the wire and is accomplished by adding acetic anhydride to the solution which reacts with the monoethanolamine in the primary reaction as shown in reaction 2 below:

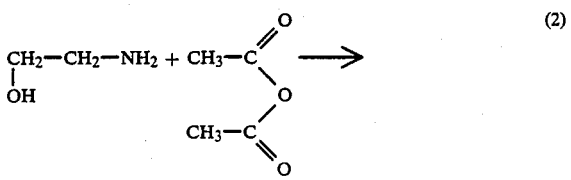
(2)

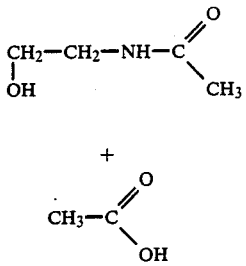

However certain additional side reactions also occur during this neutralization process, the most important of which is shown below in reaction 3.

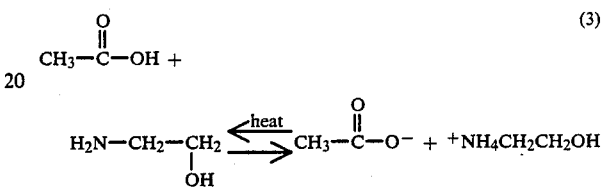
(3)

This reaction being reversible at relatively low temperatures (about 80° C. to about 100° C.) means that during the oven curing of the coating (which temperatures exceed those to reverse the reaction) acetic acid and monoethanolamine are produced. The acetic acid is easily volatilized out of the coating during curing but the ethanolamine is not completely removed and remains behind. This material is known to be deleterious to many wire varnish curing mechanisms. Therefore, the use of this nylon as a wire coating (particularly for fine wires) results in wire having undercured coatings which do not effectively adhere to the wire or to wire whose mechanical and electrical properties are prematurely reduced during use.

In addition, the resulting wire coatings do not exhibit uniform properties from batch to batch and quality control is difficult. One evidence of this is the fluctuation in the mandrel pull test used to test the ability of wire coating to withstand stress cycles without exhibiting cracks or defects in the wire coating. Coatings formed using the conventional monoethanolamine approach to preparing the equilibrated polyamide exhibits wide fluctuations in their ability to pass such tests and in many instances the wire is unacceptable.

Therefore, what is needed in the art is a method by which the polyamide resin may be equilibrated without the introduction or resulting by-products which will affect the quality of the final coated wire product.

DISCLOSURE OF INVENTION

The present invention discloses a magnet wire enamel composition which is the reaction product of a polyamide resin, a solvolytic agent in the presence of an organic titanate admixed with a blocked polyisocyanate and a hydroxyl rich polyester.

Also disclosed is a magnet wire substrate which is electrically insulated with one or more layers of the resultant enamel composition of the present invention.

Also disclosed is a method for applying the present enamel composition to magnet wire substrate.

Further disclosed is a method of manufacturing the wire enamel composition of the present invention.

Other features and advantages of the present invention will become more apparent from the following detailed description of the preferred embodiment.

BEST MODE FOR CARRYING OUT THE INVENTION

A solution of the polyamide resin is prepared in the conventional manner by dissolving the resin in a suitable organic solvent or mixture of organic solvents. These solvents are generally conventional hydroxyl containing aromatic hydrocarbons and some typical ones are cresylic acid and phenol. The preferred solvent is a mixture of cresylic acid and phenol, typically in concentrations of about 25 percent by weight cresylic acid to about 75 percent by weight phenol. It is preferred that for an enamel which is to be stored or is desired to have a stable shelf life, that the solvent contain greater than 60 percent by weight of phenol.

The polyamide resin may be any polyamide resin useful as magnet wire coatings. These are usually conventional nylon resins such as nylon 6; nylon 6,6; nylon 11; nylon 12 and aliphatic aromatic nylons such as Trogamide ®. The preferred nylon is nylon 6,6 because of its high melt point. These nylons are commercially available and will have molecular weights (weight averaged) ranging above 25,000 and ususally between 25,000 to 40,000 and preferably between 25,000 to 35,000. The dissolution of the resin in a solvent is performed using conventional techniques and equipment. Although almost any concentration of resin in the solution may be possible to practice this invention, it is most practical to formulate the solution having a resin solids concentration from about 10 percent to about 30 percent by weight with about 8 percent to about 15 percent by weight being preferred.

Once the polyamide resin has been dissolved, the solvolytic agents may be introduced. These agents will be components particularly organic acids having at least one active hydrogen which may react with the polyamide resin during the equilibration. The preferred agents are the aliphatic or aromatic alcohols such as ethylene glycol, however, other materials which may be used are adipic acid, hexamethylene diamine, water or the active hydrogen terminated polyamides and other polyalcohols. The solvolytic agent is generally added in amounts ranging from about 0.05 percent to about 15 percent by weight of the polyamide resin. It should be noted that the more solvolytic agent added relative to the polyamide resin, the lower the molecular weight of the equilibrated resin will be and therefore, the lower the viscosity. Therefore, if one wanted to make a very low viscosity wire coating of a polyamide resin, one would add increasingly greater amounts of the solvolytic agent. However, the preferred range is between about 0.05 percent to about 5 percent by weight of the solvolytic agent to the polyamide resin.

To this solution is then added an organic titanate catalyst such as a chelate, alkyl or aromatic titanate. These titanates may be any of the organic titanates, such as those sold by DuPont Corporation under the trademark Tyzo- ® titanates or others. These titanates can be tetra-alkyl titanates having the formula Ti(OR)$_4$ where R is an alkyl group typically containing at least three carbon atoms. Examples of titanates such as these are tetra-isopropyl titanate, tetra-N-butyl titanate or tetrakis (2-ethyl hexyl) titanate. Other useful titanates can also be aromatic titanates having the formula Ti(OR)$_4$ where R is an aromatic group and including polymeric titanates (typically dimers and trimers). Titanates of this variety are cresylic (or phenolic) titanates or their derivatives such as tetra-alkyl (e.g. ethyl, propyl etc.) phenolic, xylenolic, halogenated phenolic, etc. The dimers and trimers will typically be linear (but may be branched) and chain extended through the —TiO— group e.g.

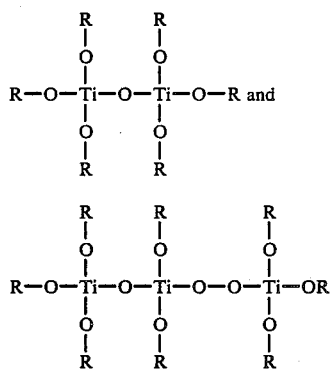

However the preferred materials are the titanate chelates such as acetyl acetonate titanate, ethyl acetonate titanate, etc. These materials will have a structure

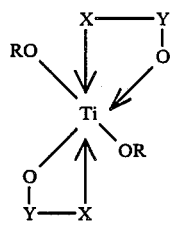

in which X represents a functional group containing oxygen or nitrogen and Y represents a two or three carbon chain, and R is an alkyl group typically containing at least three carbon atoms. The most preferred titanate is the acetylacetonate titanates having the structure

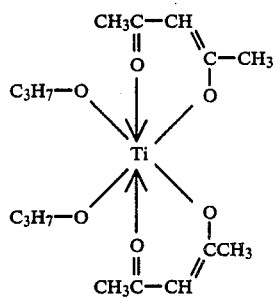

In addition to these individul titanates, mixtures of these titanates may also be used.

The titanate catalyst is added to the solution in concentrations of about 0.5 percent to about 5 percent by weight based on the weight of the resin present in the solution. The preferred concentration is about 1 percent to about 2 percent by weight of the polymer resin. All of the reagents should be mixed to a homogenous solution using conventional mixing or stirring apparatus. The solution is then heated to above its reaction temperature which is typically above 100° C. and more typically in excess of 140° C. with the preferred range being about 140° C. to about 160° C. The lower limit will be determined by the speed at which the reaction takes place (e.g. the lower the temperature the slower the reaction) while the upper temperature limit will be a function of the thermal stability of the reactants.

Although not wishing to be bound by any particular theory, it is believed that the hydrolysis takes place as a trans amide esterfication which takes place as shown below in reaction 4.

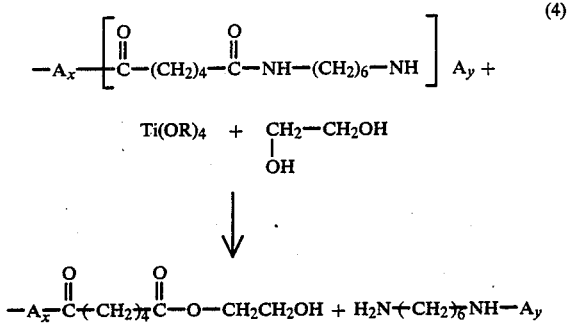

wherein x+y=10 to 200 and

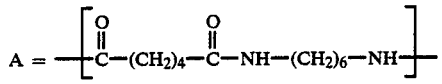

The reaction effectively cleaves the larger molecules of the resin in half thereby reducing the molecular weight in half as well. This results in a resin with significantly lower viscosities at the same solids content. It has been discovered that the use of the titanates are a critical feature of the equilibration process using these solvolytic agents. It appears that the titanates act as catalysts to advance the reaction at a speed which makes the reaction practical in a production environment. It has been noted that the reaction remains at a virtual standstill irregardless of the temperature until the introduction of the titanates. Once the titanate is added, the reaction advances at a reasonable pace. It has also been noted that the more titanate which is added to the reactants, the faster the reaction advances.

In determining how far to allow the equilibration process to advance samples are taken from the reaction vessel periodically. These samples are then diluted to the predetermined final solids content desired using a solvent mixture of phenol and cresylic acid (other compatible mixtures may be used if desired), and viscosity measurements are made on the samples. When the reaction material reaches the predetermined viscosity at a given temperature, the reaction is cooled to below 212° F. (100° C.). The solids content and viscosity of the desired final product will, of course, be a function of the enameling requirements of a given user and must be determined for each application.

To the resulting equilibrated polyamide resin solution is added a blocked polyisocyanate and a hydroxyl rich polyester. The blocked polyisocyanate used may be any of the conventional blocked isocyanates useful in the production of polyurethane in the reaction with a hydroxyl rich polyester. Although the isocyanate may be aromatic or aliphatic, the preferred material must be multi-functional. The most preferred material is manufactured by Mobay Chemical Company and is called Mobay Desmodur AP Stabil and is a blocked trifunctional isocyanate. The resulting blocked isocyanate will unblock at temperatures compatible with the curing process of the enamel yet above the application temperature of the enamel to the wire. This allows the enamel to be stable during preparation and application to the wire but react with the hydroxyl polyester when the coated wire is passed through the curing oven. Typically the curing oven will be about 750° F. or higher while the application process is carried out at temperatures below about 150° F. (65.5° C.). Therefore, these blocked isocyanates should react accordingly between these temperatures.

Typically, the polyisocyanates will be present in amounts from about 20 to about 90 parts by weight per 100 parts by weight of the polyamide resin with the preferred amount being about 20 to about 50 parts by weight. More or less than these amounts can be added however, should too much polyisocyanate be added, insufficient cure of the enamel will take place and if too little isocyanate is added, the cured enamel will be too brittle.

The hydroxyl rich polyester useful in practicing this invention are those polyesters which are hydroxyl terminated, nonlinear polyesters having molecular weights in the range of about 2,500 to 10,000 and preferably between about 2,500 to about 5,000 (based on polystyrene as run on gel permeation chromatography). The weight ratio between the blocked isocyanate and the hydroxyl rich polyester should be such that the ratio of isocyanate (NCO) to the hydroxyl groups of the polyester (OH) should be about 0.7 to 2.0.

These polyesters are typically present in the ratio described in relationship to the polyisocyanate. Typically this will result in a polyester component being present at about 5 parts to about 50 parts by weight of the polyamide with about 15-40 parts by weight being preferred.

Once the materials have been added, and the solution prepared, it is mixed or stirred in a conventional manner until homogenous. The resulting enamel may be adjusted for solids content and viscosity as desired using compatible solvents to suit the particular enameling and curing requirements of the wire enameling process to be used.

Thereafter these enamels may be applied using conventional wire enamel application to apply a thin film of enamel to the substrate and thereafter curing the enamel by exposure to heat.

EXAMPLE

An enamel of the present invention was prepared as follows:

To 143.3 pounds cresylic acid was added 48.4 pounds of reprocessed nylon 66 fiber having an average molecular weight of 35,000 (weight averaged), 0.1 pounds of tetra acetylacetonate titanate and 2.4 pounds of ethylene glycol. This solution was agitated and purged with nitrogen gas at ten standard cubic feet per minute (SCFM) for fifteen minutes and the flow rate was then reduced to 1 SCFM. The contents were then heated to a temperature of about 302° F.–311° F. (150° C.–155° C.). Agitation and nitrogen purge continued during the entire equilibration process. After the solution had been at temperature for about 5 hours, samples were removed every two hours thereafter, thinned to a predetermined solids level, and tested for viscosity until such time as the viscosity reached a previously determined set point of 160 centipoise at 86° F. (30° C.). Additionally, the solids contents of the solution was determined during every other sample. After the control point had been met, the heat was turned off, the solution cooled to about 80° F. (26.6° C.) at which time 113.5 pounds of cresylic acid and 112.4 pounds of xylene were added to the solution and the temperature was again increased to about 212° F. (100° C.). To this solution was added 26.2 pounds of AP Stabil and 13.6 pounds of hydroxyl terminated polyester, and while agitation was continued, the solution was mixed for 2 hours. After the material had been at temperature for the 2 hours, the enamel was cooled to about 104° F.–122° F. (40° C.–50° C.), then filtered through a 5 micron filter. The enamel had a final solids content of 16.1 percent, and a viscosjity of 160 centipoise at 86° F. (30° C.).

The enamel was then applied in a conventional manner by drawing the wire in contact with the enamel and forming a thin, smooth enamel coating onto the copper wire (28 American Wire Gauge) which previously had enamel basecoat applied to it at a thickness of 1.4 mils. This coated wire was then passed through an oven thereby curing the enamel. The topcoat enamel was applied to a thickness of 0.5 mils. Additionally, a nylon topcoat, which had been equilibrated using the traditional monoethanolamine and acetic anhydride process, was applied to similar wire having the same enamel basecoat. Each of the wires were tested for stress using the mandrel pull test and the results of the test are as indicated below:

The test comprises bending or wrapping the wire about a mandrel which is five times the diameter of the bare wire, pulling the mandrel along the length of the wire with a smooth rapid motion, and then inspecting the insulation for cracking. The Table below shows the number of pulls which the individual wire withstood until the enamel cracked sufficiently to cause it to fail.

TABLE

| Traditional nylon | 1 | 10 | 7 | 4 |
|---|---|---|---|---|
| Present Process nylon | 12 | 15 | 13 | 15 |

As may be seen from the data, the equilibrated nylon topcoat developed using the present process has been consistently high and acceptable while the prior art nylon coating is unpredictable and unacceptable for acceptability of a wire is 10.

The enameling composition offers a number of advantages to the prior art polyamide systems. First the enamel will not contain any residual, reversible reaction products for the equilibration of the polyamide resin. Therefore, the resin will cure properly without interference from the ethanolamine and more uniform coating batches will be possible.

Secondly, the equilibration of the polyamide resin prior to reaction with the polyester and the isocyanate, the resulting enamels will be capable of making higher solids contents enamels with lower working vicosities. This will allow more enamel to be applied per pass using conventional application techniques and will require less solvent, thereby reducing the cost.

Thirdly, as demonstrated in the test data, the urethane modified polyamide coatings of the present invention have improved stress capabilities over the modified polyurethane nylon enamels which were not subjected to the present equilibration process.

It should be understood that the invention is not limited to the particular embodiments shown and described herein, but that various changes and modifications may be made without departing from the spirit and scope of this novel concept as defined by the following claims.

I claim:

1. A magnet wire enamel comprising the reaction product of a polyamide resin with a solvolytic agent in the presence of a organic titanate admixed with a blocked polyisocyanate and a hydroxyl rich polyester.

2. The composition of claim 1 wherein the titanate catalyst is present at concentrations of about 0.5 percent to about 2.0 percent by weight of the polyamide resin.

3. The composition of claim 2 wherein the organic titanate catalyst is a tetra-alkyl titanate.

4. The composition of claim 3 wherein the solvolytic agent is a diol.

5. The composition of claim 4 wherein the diol is ethylene glycol.

6. A method of making a magnet wire enamel comprising:
making a solution of a polyamide resin, a solvolytic agent and a titanate catalyst,
heating the solution to a temperature above 284° F. (140° C.) thereby causing the polyamide resin to equilibrate, and
admixing the equilibrated solution with a blocked polyisocyanate and a hydroxylated polyester resin.

7. A magnet wire enamel comprising the reaction product of a nylon resin with a solvolytic agent having at least one active hydrogen said reaction taking place in the presence of an orgainc titanate catalyst, said reaction product admixed with a blocked polyisocyanate and a hydroxyl terminated polyester resin.

* * * * *